United States Patent
Olsen, Jr. et al.

(10) Patent No.: US 11,909,351 B2
(45) Date of Patent: *Feb. 20, 2024

(54) INLINE DC FEEDER DC/DC VOLTAGE STEP-UP HARNESS

(71) Applicant: ADERIS ENERGY, LLC, Cornelius, NC (US)

(72) Inventors: Olee Joel Olsen, Jr., Cornelius, NC (US); Adam Will Foodman, Charlotte, NC (US); Bradley Allan Micallef, Davidson, NC (US)

(73) Assignee: ADERIS ENERGY, LLC, Cornelius, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,275

(22) Filed: Oct. 7, 2022

(65) Prior Publication Data
US 2023/0223899 A1 Jul. 13, 2023

Related U.S. Application Data

(63) Continuation of application No. 17/306,462, filed on May 3, 2021, now Pat. No. 11,476,800.

(60) Provisional application No. 63/018,925, filed on May 1, 2020.

(51) Int. Cl.
*H02S 40/36* (2014.01)
*H02S 40/32* (2014.01)
*H02M 3/02* (2006.01)

(52) U.S. Cl.
CPC ............... *H02S 40/36* (2014.12); *H02M 3/02* (2013.01); *H02S 40/32* (2014.12)

(58) Field of Classification Search
CPC .......... H02M 3/02; H02S 40/36; H02S 40/32
See application file for complete search history.

(56) References Cited

U.S. PATENT DOCUMENTS

| 11,476,800 | B1 | 10/2022 | Olsen, Jr. | |
| 2017/0077709 | A1* | 3/2017 | Kim | ........................ H02J 3/46 |
| 2020/0136383 | A1* | 4/2020 | Buchhold | ............... H02M 7/48 |

OTHER PUBLICATIONS

Information Disclosure Statement (IDS) Letter Regarding Common Patent Application(s), dated Nov. 8, 2022.

* cited by examiner

*Primary Examiner* — Jue Zhang
*Assistant Examiner* — Lakaisha Jackson
(74) *Attorney, Agent, or Firm* — TILLMAN WRIGHT, PLLC; Chad D. Tillman; James D. Wright

(57) ABSTRACT

An inline DC feeder DC/DC voltage step-up harness for photovoltaic solar facilities includes a housing, a plurality of PV input connectors, an at least one PV output connector. The housing incorporates a DC/DC converter, and has an input and an output. The plurality of PV input connectors are operatively connected to the housing at the input. The PV output connector is operatively connected to the housing at the output.

5 Claims, 3 Drawing Sheets

IDF-VSH Electrical Schematic & Physical Arrangement

INLINE DC FEEDER DC/DC VOLTAGE STEP-UP HARNESS

TECHNICAL FIELD AND BACKGROUND OF THE DISCLOSURE

The present disclosure relates broadly and generally to an Inline DC Feeder DC/DC Voltage Step-up Harness—referred to herein as "IDF-VSH". In exemplary embodiments, the present IDF-VSH is designed for the purpose of enabling the retrofit of older photovoltaic (PV) solar facilities with modules rated at 600 or 1,000 volts direct current (DC). The exemplary IDF-VSH electrically combines multiple existing PV strings into a galvanically isolated harness assembly that increases the voltage to a greater system voltage, such as 1,500 Vdc, and regulates the output to a predetermined amperage limit, such as 30 A.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

According to one exemplary embodiment, the present disclosure comprises an Inline DC Feeder DC/DC Voltage Step-up Harness (or "IDF-VSH").

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
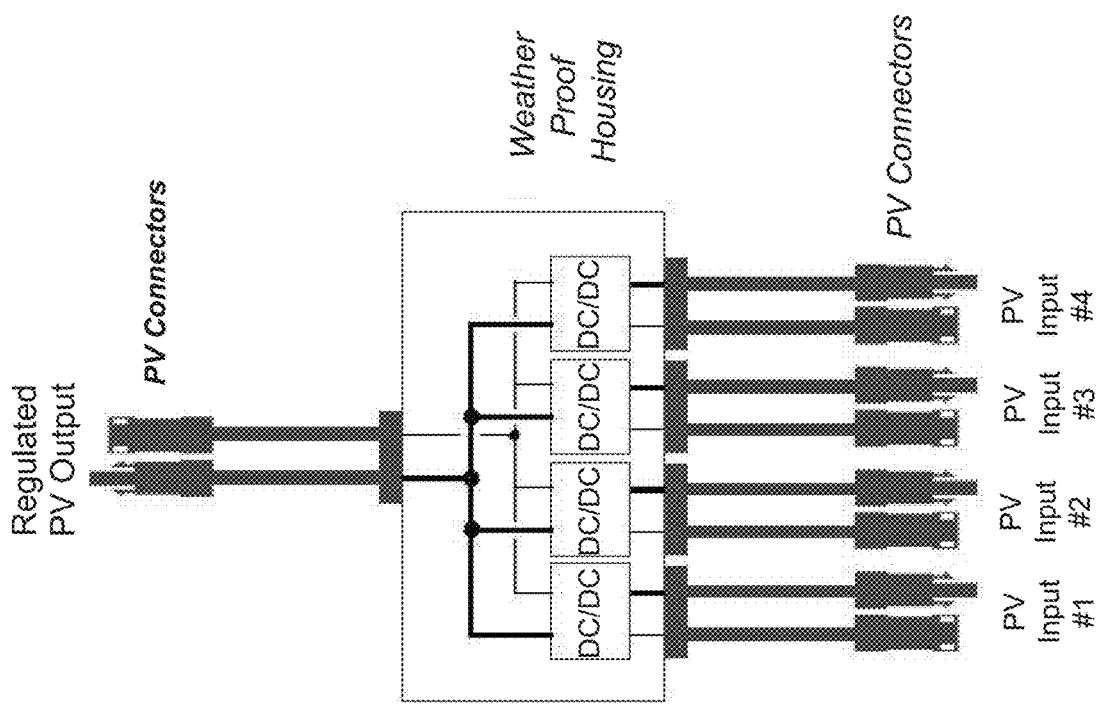
FIG. 1 illustrates an exemplary IDF-VSH Electrical Schematic and Physical Arrangement.
Figure 2:
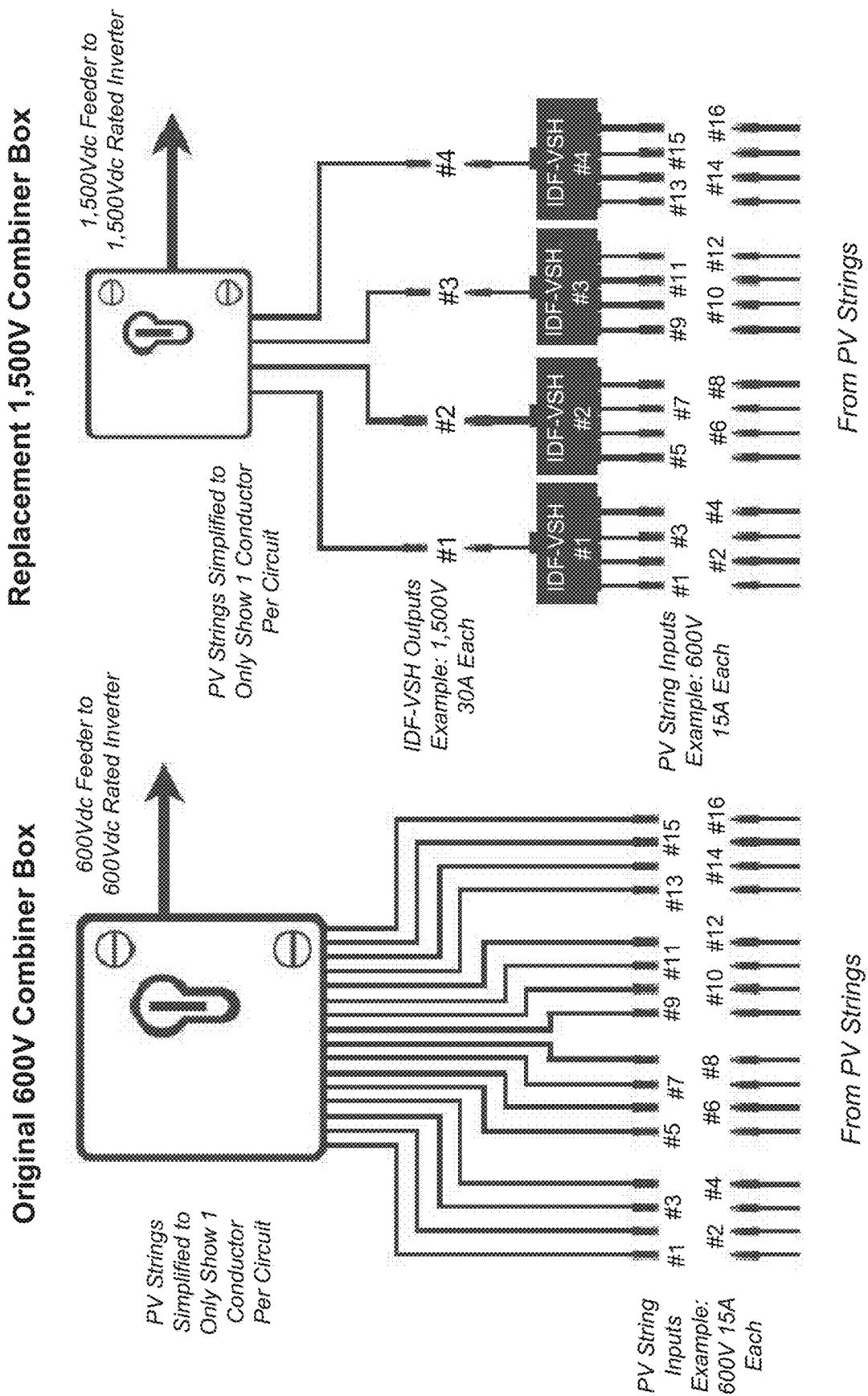
FIG. 2 illustrates the exemplary IDF-VSH—Use Example #1: Combiner Box Replacement.
Figure 3:
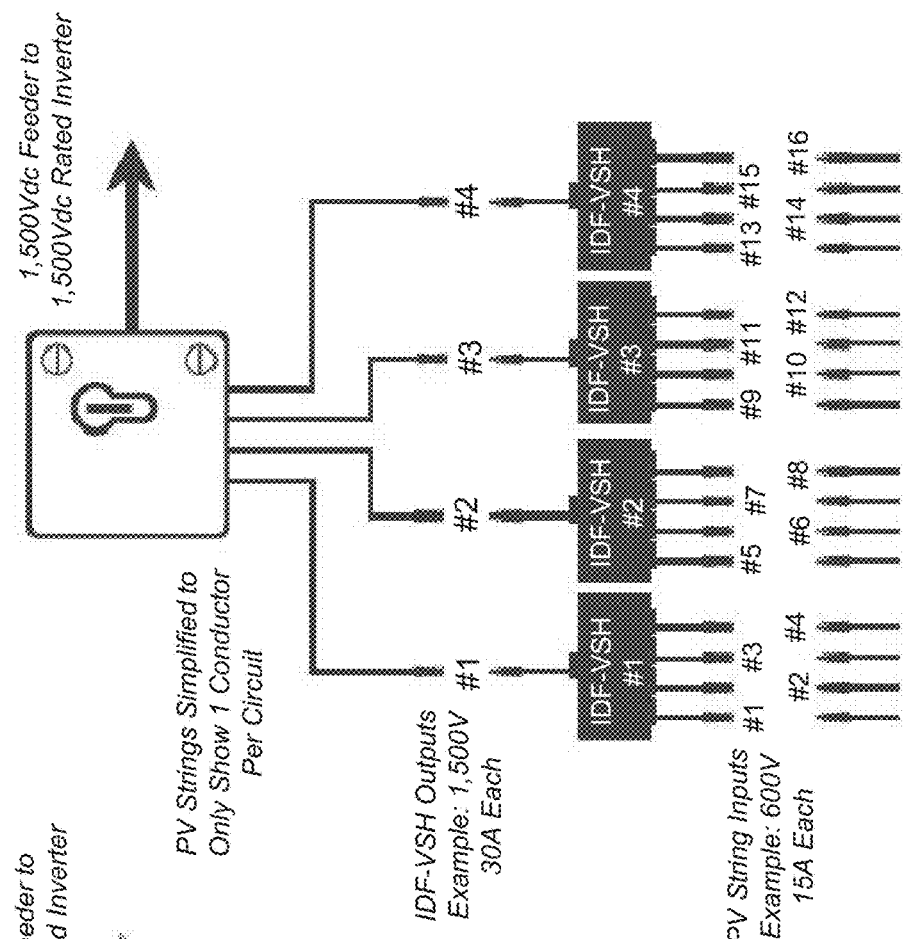
FIG. 3 further illustrates the exemplary IDF-VSH—Use Example #2: Combiner Box Replaced with Inverter.
Figure 3:
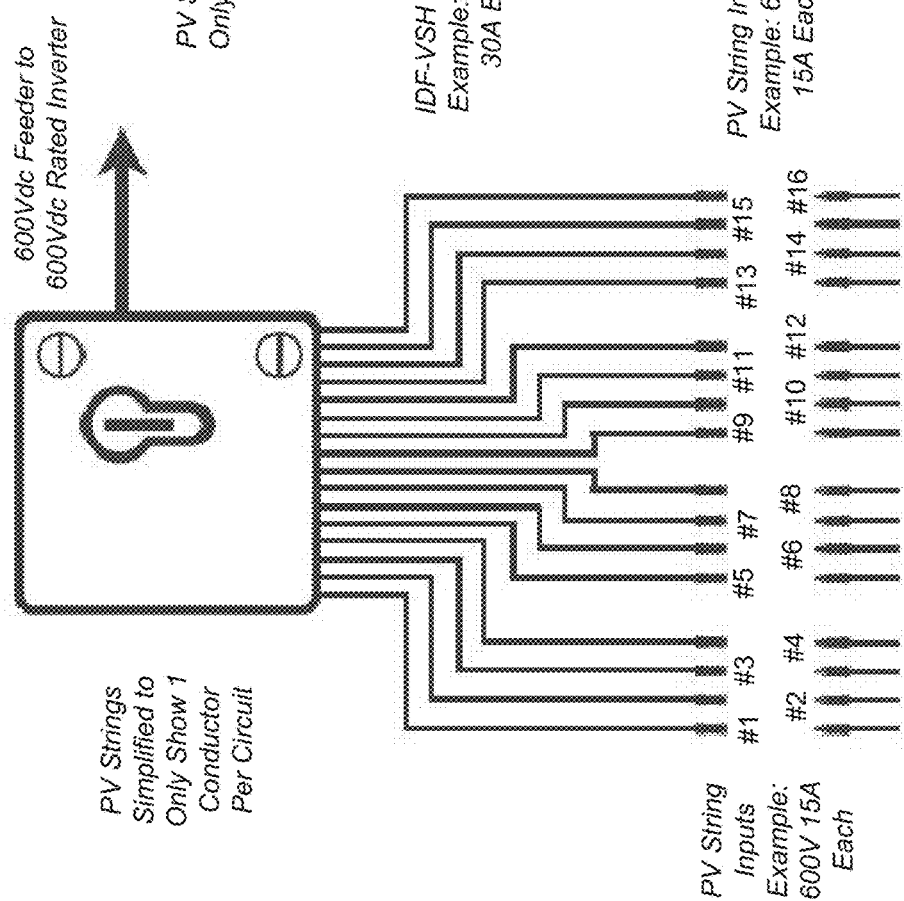

In exemplary embodiments described herein and represented in the attached drawings, FIGS. 1-3, the present disclosure comprises an Inline DC Feeder DC/DC Voltage Step-up Harness (or "IDF-VSH").

Referring to FIG. 1, in traditional 600 Vdc and 1,000 Vdc PV solar systems, a multitude of PV strings will be combined into a fused DC combiner box—e.g., from 12 to 32 strings per box. The configuration of the exemplary IDF-VSH is specifically designed to take four (4) or more of the strings as inputs, outputting a single string rated at 1,500 Vdc 30 A or more, so the output may be connected to a higher rated DC voltage system. Using current technology, an existing 600 Vdc sixteen (16) string combiner box could use four (4) of the exemplary IDF-VSH to provide a four (4) 1,500 Vdc 30 A outputs to power a string inverter, or power a 1,500 Vdc rated combiner box that then feeds a 1,500 Vdc rated central inverter.

The present IDF-VSH may utilize a flyback DC/DC converter for each string input, where each input is terminated with standard PV connectors, and the output is also terminated with standard PV connectors. The four (4) input, one (1) output IDF-VSH may be used in isolation as a single unit, or in groups to achieve the desired output string configuration. Additionally, the exemplary IDF-VSH may be electrically configured to accept a variety of DC voltage input rages, counts, and connector types—as well as a variety of DC voltage output rages, and connector types. In all configurations, however, the IDF-VSH may be housed in a suitable outdoor rated weather tight housing.

The example illustrated in FIG. 2 demonstrates how the present IDF-VSH may be used to enable the replacement of a 600 Vdc rated combiner box, enabling the use of higher voltage rated combiner box, and upstream higher voltage rated inverters as well. FIG. 3 demonstrates how the present IDF-VSH may be used to enable the replacement of a 600 Vdc rated combiner box with a 1,500 Vdc rated inverter.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. An inline DC feeder DC/DC voltage step-up harness for photovoltaic solar facilities, comprising:
    a housing containing a plurality of DC/DC converters, each having a two-pole input and a two-pole output, wherein the outputs of the DC/DC converters are connected together in parallel in the housing and provided as an exterior two-pole output from the housing;
    wherein each pole of the input of each of the plurality of DC/DC converters is terminated with a connector adapted to connect to a corresponding connector operatively connected to an existing circuit; and
    wherein each pole of the exterior output from the housing is terminated with a connector adapted to connect to a respective corresponding connector operatively connected to a DC combiner box.

2. An inline DC voltage step-up system for retrofitting a photovoltaic (PV) solar facility to provide a new, higher-voltage output, the system comprising:
    (a) an inline DC feeder DC/DC voltage step-up harness, including:
        (i) a housing,
        (ii) a plurality of DC/DC converters disposed within the housing, each DC/DC converter having a two-pole input and a two-pole output,
        (iii) wherein the outputs of the DC/DC converters are connected together in parallel in the housing and provided as an exterior two-pole output from the housing,
        (iv) wherein each pole of the input of each of the plurality of DC/DC converters is terminated with a connector adapted to connect to a respective corresponding connector operatively connected to an existing circuit, and
        (v) wherein each pole of the exterior output from the housing is terminated with a connector; and
    (b) a DC combiner box having a two-pole input, terminated with connectors coupled to the connectors of the exterior output of the inline DC feeder DC/DC voltage step-up harness, and an output connected to a load.

3. A method of retrofitting a photovoltaic (PV) solar facility to replace an existing lower-voltage module, connected to connectors that terminate output circuits from the PV solar facility, with a new higher-voltage module, the existing lower-voltage module providing output voltage to a load at a first voltage, the method comprising:
    (a) providing an inline DC feeder DC/DC voltage step-up harness and a first DC combiner box, wherein the inline DC feeder DC/DC voltage step-up harness includes:
        (i) a housing,
        (ii) a plurality of DC/DC converters disposed within the housing, each DC/DC converter having a two-pole input and a two-pole output,
        (iii) wherein the outputs of the DC/DC converters are connected together in parallel in the housing and provided as an exterior two-pole output from the housing,
        (iv) wherein each pole of the input of each of the plurality of DC/DC converters is terminated with a connector, and
        (v) wherein each pole of the exterior output from the housing is terminated with a connector; and
    (b) disconnecting a second DC combiner box from the plurality of connectors that terminate output circuits from the PV solar facility;
    (c) after disconnecting, connecting inline DC feeder DC/DC voltage step-up harness to the output circuits from the PV solar facility by connecting the respective connectors together;
    (d) connecting the first DC combiner box to the output from the housing via the respective connectors; and
    (e) thereafter, providing an output voltage to the load at a second voltage, the second voltage being greater than the first voltage.

4. The method of claim 3, wherein the first DC combiner box is a replacement combiner box.

5. The method of claim 3, wherein the first voltage is 600 VDC or 1000 VDC, and the second voltage is 1500 VDC.

* * * * *